US008884765B2

(12) United States Patent
MacKenzie et al.

(10) Patent No.: US 8,884,765 B2
(45) Date of Patent: Nov. 11, 2014

(54) RF AND/OR RF IDENTIFICATION TAG/DEVICE HAVING AN INTEGRATED INTERPOSER, AND METHODS FOR MAKING AND USING THE SAME

(75) Inventors: J. Devin MacKenzie, San Carlos, CA (US); Vikram Pavate, San Mateo, CA (US)

(73) Assignee: Thin Film Electronics ASA, Oslo (NO)

( * ) Notice: Subject to any disclaimer, the term of this patent is extended or adjusted under 35 U.S.C. 154(b) by 0 days.

(21) Appl. No.: 13/428,668

(22) Filed: Mar. 23, 2012

(65) Prior Publication Data

US 2012/0176226 A1    Jul. 12, 2012

Related U.S. Application Data

(63) Continuation of application No. 11/243,460, filed on Oct. 3, 2005.

(60) Provisional application No. 60/617,617, filed on Oct. 8, 2004.

(51) Int. Cl.
*G08B 23/00* (2006.01)
*G08B 13/24* (2006.01)
*G06K 19/077* (2006.01)

(52) U.S. Cl.
CPC ...... *G06K 19/07749* (2013.01); *G08B 13/2437* (2013.01); *G06K 19/0775* (2013.01); *G08B 13/2417* (2013.01)
USPC ............ 340/572.1; 257/679; 340/572.3; 340/572.5; 340/572.7

(58) Field of Classification Search
USPC ............. 257/679; 340/572.1, 572.3, 572.5, 340/572.7
See application file for complete search history.

(56) References Cited

U.S. PATENT DOCUMENTS 4,223,830 A    9/1980   Walton
4,496,076 A *  1/1985   Tompkins ............ 222/3

(Continued)

FOREIGN PATENT DOCUMENTS

CA    2 528 797 A1    6/2007
EP    1 544 907 A1    6/2005

(Continued)

OTHER PUBLICATIONS

Randy Hoffman and John Wager; "Transistor Device"; Japanese Publication No. 2005-183984; Publication Date: Jul. 7, 2005; Patent Abstracts of Japan; Japanese Patent Office, Japan.

(Continued)

*Primary Examiner* — David Vu
*Assistant Examiner* — Brandon Fox
(74) *Attorney, Agent, or Firm* — Andrew D. Fortney; Central California IP Group, P.C.

(57) ABSTRACT

A MOS RF surveillance and/or identification tag, and methods for its manufacture and use. The tag includes an interposer, an antenna/inductor, and integrated circuitry on the interposer. The integrated circuitry has a lowest layer in physical contact with the interposer. The method of manufacture includes forming a lowest layer of integrated circuitry on an interposer, forming successive layers of the integrated circuitry on the lowest layer of integrated circuitry, and attaching an electrically conductive functional layer to the interposer. Alternatively, an electrically conductive structure may be formed from a functional layer attached to the interposer. The method of use includes causing/inducing a current in the present tag sufficient for it to generate, reflect or modulate a detectable electromagnetic signal, detecting the signal, and optionally, processing information conveyed by the detectable electromagnetic signal.

25 Claims, 4 Drawing Sheets

(56) References Cited

U.S. PATENT DOCUMENTS

| | | | |
|---|---|---|---|
| 4,498,076 A * | 2/1985 | Lichtblau | 340/572.3 |
| 4,666,735 A | 5/1987 | Hoover et al. | |
| 5,081,445 A | 1/1992 | Gill et al. | |
| 5,099,225 A | 3/1992 | Narlow et al. | |
| 5,111,186 A | 5/1992 | Narlow et al. | |
| 5,218,189 A | 6/1993 | Hutchison | |
| 5,257,009 A | 10/1993 | Narlow | |
| 5,510,769 A | 4/1996 | Kajfez et al. | |
| 5,528,222 A | 6/1996 | Moskowitz et al. | |
| 5,608,246 A | 3/1997 | Yeager et al. | |
| 5,612,235 A | 3/1997 | Wu et al. | |
| 5,658,808 A | 8/1997 | Lin | |
| 5,796,121 A | 8/1998 | Gates | |
| 5,821,137 A | 10/1998 | Wakai et al. | |
| 5,841,350 A | 11/1998 | Appalucci et al. | |
| 5,861,809 A | 1/1999 | Eckstein et al. | |
| 5,989,944 A | 11/1999 | Yoon | |
| 6,054,396 A * | 4/2000 | Doan | 438/763 |
| 6,091,332 A | 7/2000 | Eberhardt et al. | |
| 6,091,607 A | 7/2000 | McKeown et al. | |
| 6,094,138 A | 7/2000 | Eberhardt et al. | |
| 6,147,605 A | 11/2000 | Vega et al. | |
| 6,246,327 B1 | 6/2001 | Eberhardt | |
| 6,274,412 B1 | 8/2001 | Kydd et al. | |
| 6,294,401 B1 | 9/2001 | Jacobson et al. | |
| 6,348,295 B1 | 2/2002 | Griffith et al. | |
| 6,379,745 B1 | 4/2002 | Kydd et al. | |
| 6,400,271 B1 | 6/2002 | Davies, Jr. et al. | |
| 6,509,217 B1 | 1/2003 | Reddy | |
| 6,518,087 B1 | 2/2003 | Furusawa et al. | |
| 6,522,308 B1 * | 2/2003 | Mathieu | 343/895 |
| 6,535,108 B1 | 3/2003 | Schrott et al. | |
| 6,541,354 B1 | 4/2003 | Shimoda et al. | |
| 6,665,193 B1 | 12/2003 | Chung et al. | |
| 6,693,541 B2 | 2/2004 | Egbert | |
| 6,765,249 B2 | 7/2004 | Voutsas et al. | |
| 6,767,775 B1 | 7/2004 | Yudasaka et al. | |
| 6,816,380 B2 | 11/2004 | Credelle et al. | |
| 6,882,545 B2 | 4/2005 | Akita et al. | |
| 6,891,110 B1 | 5/2005 | Pennaz et al. | |
| 6,916,722 B2 * | 7/2005 | Huang et al. | 438/396 |
| 6,940,408 B2 | 9/2005 | Ferguson et al. | |
| 7,026,713 B2 | 4/2006 | Hoffman et al. | |
| 7,064,015 B2 | 6/2006 | Azuma | |
| 7,152,804 B1 | 12/2006 | MacKenzie et al. | |
| 7,224,280 B2 | 5/2007 | Ferguson et al. | |
| 7,256,418 B2 | 8/2007 | Ong et al. | |
| 7,260,882 B2 | 8/2007 | Credelle et al. | |
| 7,335,556 B2 | 2/2008 | Yamaguchi et al. | |
| 7,619,248 B1 | 11/2009 | Cleeves | |
| 7,623,034 B2 | 11/2009 | Ferguson et al. | |
| 7,687,327 B2 | 3/2010 | Cleeves et al. | |
| 2001/0040507 A1 | 11/2001 | Eckstein et al. | |
| 2002/0163434 A1 | 11/2002 | Burke | |
| 2003/0108664 A1 | 6/2003 | Kodas et al. | |
| 2003/0214792 A1 * | 11/2003 | Credelle et al. | 361/760 |
| 2004/0053431 A1 | 3/2004 | Chang et al. | |
| 2004/0080021 A1 * | 4/2004 | Casper et al. | 257/528 |
| 2004/0164302 A1 | 8/2004 | Arai et al. | |
| 2004/0189625 A1 | 9/2004 | Sato | |
| 2005/0026317 A1 | 2/2005 | Sirringhaus et al. | |
| 2005/0133790 A1 | 6/2005 | Kato | |
| 2005/0133917 A1 | 6/2005 | Hoffman et al. | |
| 2005/0134435 A1 | 6/2005 | Koyama et al. | |
| 2005/0134463 A1 | 6/2005 | Yamazaki | |
| 2005/0140495 A1 | 6/2005 | Yamazaki et al. | |
| 2005/0148121 A1 | 7/2005 | Yamazaki et al. | |
| 2005/0181566 A1 | 8/2005 | Machida et al. | |
| 2005/0198811 A1 | 9/2005 | Kurz et al. | |
| 2005/0200684 A1 | 9/2005 | Sakurada et al. | |
| 2005/0263767 A1 | 12/2005 | Yamazaki et al. | |
| 2005/0272244 A1 | 12/2005 | Wada | |
| 2005/0276115 A1 | 12/2005 | Yamaguchi et al. | |
| 2006/0125098 A1 | 6/2006 | Hoffman et al. | |
| 2006/0238345 A1 | 10/2006 | Ferguson et al. | |
| 2008/0138971 A1 | 6/2008 | Yamaguchi et al. | |
| 2008/0295318 A1 | 12/2008 | Bohn | |

FOREIGN PATENT DOCUMENTS

| | | |
|---|---|---|
| JP | 2005-183984 A | 7/2005 |
| JP | 2006-32917 A | 2/2006 |
| JP | 2006-209393 A | 8/2006 |
| TW | 200632763 | 9/2006 |
| WO | 01/46987 A2 | 6/2001 |
| WO | 2005/076206 A1 | 8/2005 |
| WO | 2006/116551 A1 | 11/2006 |

OTHER PUBLICATIONS

Tetsuji Yamaguchi and Hajime Tokunaga; "Manufacturing Method of Semiconductor Device"; Espacenet; Japanese Publication No. JP 2006032917 (A); Publication Date: Feb. 2, 2006; Espacenet Database—Worldwide; http://worldwide.espacenet.com/.

Hideto Sakata, Kiichi Shimomura and Hiroyuki Kudo; "Interposer Mounting Method and Device"; Espacenet; Japanese Publication No. JP 2006209393 (A); Publication Date: Aug. 10, 2006; Espacenet Database—Worldwide; http://worldwide.espacenet.com/.

Andreas Ullmann, Walter Fix and Markus Bohm; "Electronics Components with Modulator"; Taiwan Patent Search; Taiwanese Publication No. 200632763; 2 pages; Publication Date: Sep. 16, 2006; Taiwan Intellectual Property Office, People's Republic of China.

Martin Bohn; "Method and Device for Continuously Producing Electronic Film Components, and An Electronic Film Component"; espacenet; PCT Publication Number: WO2005076206 (A1); Publication Date: Aug. 18, 2005; esp@cenet Database—Worldwide; http://v3.espacenet.com/publicationDetails/biblio?DB=EPODOC& adjace . . . _EP . . . .

J.H. Lee, K.C. Moon, B.H.You and M.K. Han; "The Improvement of Reliability in the POLY-Si TFTs Employing Laser Irradiation on Gate Oxide"; AM-LCD '03, pp. 169 et seq. (TFTp3-3).

Dave Treleaven and Dick James; "Integrated Circuit Passive Components"; Obtained from www.chipworks.com.

Hongmei Wang, Singh Jagar, Sang Lam and Mansun Chan; "High Frequency Performance of Large Grain Polysilicon-on-Insulator MOSFETs"; IEEE Transactions on Electron Devices, vol. 48, No. 7, Jul. 2001; pp. 1480-1482.

Zhibin Xiong, Haitao Liu, Chunxiang Zhu and Johnny K. O. Sin; A Novel Self-Aligned Offset-Gated Polysilicon TFT Using High-k Dielectric Spacers; IEEE Electron Device Letters, vol. 25, No. 4, Apr. 2004; pp. 194-195.

Canadian Office Action dated May 12, 2011; Canadian Patent Application No. 2,606,999; 3 pages; Canadian Intellectual Property Office, Canada.

Chinese Office Action dated Aug. 9, 2010 with a partial English translation; Chinese Patent Application No. 200710148833.2; 5 pages total; The State Intellectual Property Office of the P.R.C., People's Republic of China.

Chinese Office Action with English translation dated Jan. 30, 2012; Chinese Patent Application No. 200710148833.2; 5 pages total; The State Intellectual Property Office of P.R.C., People's Republic of China.

European Search Report for European Patent Application No. EP 07 01 5792; Jan. 28, 2008; 5 pages; European Patent Office; Munich, Germany.

European Office Action dated Nov. 25, 2009; European Patent Application No. 07 015 792.0-2210; 4 pages; European Patent Office; Europe.

European Office Action dated Oct. 18, 2010; European Patent Application No. 07 015 792.0-2210; 6 pages; European Patent Office; Europe.

European Office Action dated May 11, 2011; European Patent Application No. 07 015 792.0-2210; 4 pages; European Patent Office, Munich, Germany.

European Office Action dated Mar. 21, 2012; European Patent Application No. 07 015 792.0-2210; 5 pages; European Patent Office, Munich, Germany.

(56) References Cited

OTHER PUBLICATIONS

Notice of Reasons for Rejection with a partial English translation dated Oct. 5, 2010; Japanese Patent Application No. P2007-212941; 6 pages; Japanese Patent Office, Japan.

Notice of Reasons for Rejection with a partial English translation dated Sep. 13, 2011; Japanese Patent Application No. P2001-212941; 5 pages total; Japan Patent Office, Japan.

English translation of Korean Office Action 'Notice of Preliminary Rejection' dated Mar. 23, 2009; Korean Patent Application No. 10-2007-0086960; 3 pages; Korean Intellectual Property Office, Republic of Korea.

Korean Office Action (Notice of Preliminary Rejection), with English Translation; Dated Sep. 25, 2009; Korean Patent Application No. 10-2007-0086960; 5 pgs. total; Korean Intellectual Property Office, Republic of Korea.

Taiwanese Office Action received Oct. 29, 2010 with partial English translation; Taiwan Patent Application No. (02)23767439; 12 pages total; Taiwanese Intellectual Property Office, Taiwan.

* cited by examiner (Background Art)

RF AND/OR RF IDENTIFICATION TAG/DEVICE HAVING AN INTEGRATED INTERPOSER, AND METHODS FOR MAKING AND USING THE SAME

RELATED APPLICATIONS

This application is a continuation of U.S. application Ser. No. 11/243,460, filed Oct. 3, 2005, pending, which is incorporated herein by reference in its entirety and which claims the benefit of U.S. Provisional Application No. 60/617,617, filed Oct. 8, 2004.

FIELD OF THE INVENTION

The present invention generally relates to the field of sensors, electronic article surveillance (EAS), radio frequency (RF) and/or RF identification (RFID) tags and devices. More specifically, embodiments of the present invention pertain to EAS, RF and/or RFID structures and methods for their manufacturing and/or production. As a result, the present invention may provide a low-cost process for producing an RFID (or EAS) tag comprising a substrate, an RF front end or subset of an RF front end, memory and logic circuit.

DISCUSSION OF THE BACKGROUND

Remotely powered electronic devices and related systems are known. For example, U.S. Pat. No. 5,099,227, issued to Geiszler et al. and entitled "Proximity Detecting Apparatus," discloses a remotely powered device which uses electromagnetic coupling to derive power from a remote source, then uses both electromagnetic and electrostatic coupling to transmit stored data to a receiver, often collocated with the remote source. Such remotely powered communication devices are commonly known as radio frequency identification ("RFID") tags.

RFID tags and associated systems have numerous uses. For example, RFID tags are frequently used for personal identification in automated gate sentry applications, protecting secured buildings or areas. These tags often take the form of access control cards. Information stored on the RFID tag identifies the tag holder seeking access to the secured building or area. Older automated gate sentry applications generally require the person accessing the building to insert or swipe their identification card or tag into or through a reader for the system to read the information from the card or tag. Newer RFID tag systems allow the tag to be read at a short distance using radio frequency data transmission technology, thereby eliminating the need to insert or swipe an identification tag into or through a reader. Most typically, the user simply holds or places the tag near a base station, which is coupled to a security system securing the building or area. The base station transmits an excitation signal to the tag that powers circuitry contained on the tag. The circuitry, in response to the excitation signal, communicates stored information from the tag to the base station, which receives and decodes the information. The information is then processed by the security system to determine if access is appropriate. Also, RFID tags may be written (e.g., programmed and/or deactivated) remotely by an excitation signal, appropriately modulated in a predetermined manner.

Some conventional RFID tags and systems use primarily electromagnetic coupling to remotely power the remote device and couple the remote device with an exciter system and a receiver system. The exciter system generates an electromagnetic excitation signal that powers up the device and causes the device to transmit a signal which may include stored information. The receiver receives the signal produced by the remote device.

On a more basic level, RFID tag circuitry generally performs some or all of the following functions:
1. Absorption of RF energy from the reader field.
2. Conversion of an RF signal into a DC signal that powers the chip.
3. Demodulation of incoming clock, timing and/or command signals available in the RF signal from the reader.
4. State machine decision making and control logic that acts on incoming or preset instructions.
5. Counter- or register-based reading of data in digital form from a memory array or other source (e.g., the output of a sensor).
6. Storage elements (e.g., memory) that store the ID code or other information that is to be read out to the reader and/or used for security authentication (also, e.g., EAS deactivation-type memory, such as that which is configured to count a predetermined number of usages [in a transportation ticket, for instance] and/or to relay information from a sensor back to the reader).
7. Modulation of coded data, timing signals or other commands back to the tag antenna(e) for transmission to the tag reader.

On the other hand, EAS tag circuitry can eliminate some of these steps and/or functions. For example, logic-based frequency division EAS performs the basic RF energy harvesting to power an internal logic divider that then modulates the antenna(e) of the tag such that a unique subharmonic signal is returned back to the reader (see, e.g., U.K. Pat. Appl. GB 2017454A). This subharmonic signal can easily be differentiated from other noise sources (such as harmonics of the carrier) and produces an effective EAS signal. In some cases, nonlinear effects from semiconductor devices can be used to simplify things even further, such as is disclosed in U.S. Pat. No. 4,670,740. In this latter case, nonlinear effects in a semiconductor diode or varactor lead to subharmonic signals which can be detected by the reader, without the intermediate RF→DC power conversion or logic processing.

Referring to FIG. 1A, conventional RFID tags are formed by a process that can include dicing a wafer 10 manufactured by conventional wafer-based processes into a plurality of die 20, then placing the die 20 either onto an antenna or inductor carrier sheet (which may contain an etched, cut, or printed metal antenna, inductor coil or other conducting feature) or, as shown in FIG. 1B, an interposer strap (or carrier) 40, and the interposer strap 40 may then be attached to an inductor/antenna 52 on a support film 50. This process may include various physical bonding techniques, such as gluing, as well as establishing electrical interconnection(s) via wire bonding, anisotropic conductive epoxy bonding, ultrasonics, bump-bonding or flip-chip approaches. This attachment process often involves the use of heat, time, and/or UV exposure. Since the Si die 20 is usually made as small as possible (<1 mm) to reduce the cost per die, the pad elements for electrical connection on the chip 20 may be relatively small. This means that the placing operation should be of relatively high accuracy for high speed mechanical operation (e.g., placement to within 50 microns of a predetermined position is often required).

As a whole, the process of picking out a separated (sawn) die, moving it to the right place on the antenna(e), inductor, carrier, or interposer to which it is to be bonded, accurately placing it in its appropriate location, and making the physical and electrical interconnections can be a relatively slow and expensive process. In the case of processes that use an intermediate interposer, cost and throughput advantages are achieved by first attaching the die 20 to a web roll of interposer carriers 40, which can be done quickly and sometimes in parallel, as they are generally closely spaced and other novel placement operations such as fluidic self-assembly or pin bed attachment processes can be done more easily. The carriers 40 generally contain an electrical path (e.g., 34 or 36) from the die 20 to relatively larger and/or more widely distributed areas in other locations on the carrier 40 to allow high-throughput, low resolution attachment operations such as crimping or conductive adhesive attach (somewhat functionally similar to a conventional strap, as compared to a pick-and-place and/or wire bonding based process for direct integration of a chip die to an inductor substrate). In some cases, low resolution attach processes suitable for straps could be performed at costs near $0.003 or less, based on commercially available equipment and materials (Mühlbauer TMA 6000 or similar). The carriers 40 are then attached to an inductor (not shown) such that electrical connections are formed at such other locations. This interposer process may also have advantages for flip-chip or bump bonding approaches, where it may be more expensive or disadvantageous to implement the required stubs, bumps or other interconnect elements onto the larger inductor/carrier substrate by conventional means (e.g., wire bonding).

In order to reach the ~$0.01 RFID tag cost goal for item-level retail applications and other low-cost, high-volume applications, there is a need for a tag structure and process that incorporates (and preferably integrates) a less expensive substrate, a stable and effective antenna, RF front end devices, and high resolution patterned logic circuitry.

SUMMARY OF THE INVENTION

Embodiments of the present invention relate to a MOS RF and/or RFID device, sensor or tag having an integrated interposer, and methods for its manufacture and use. The device generally comprises (a) an interposer, (b) an antenna and/or inductor on the interposer; and (c) integrated circuitry on the interposer in a location other than the antenna and/or inductor, the integrated circuitry having a lowest layer in physical contact with a surface of the interposer.

The method of manufacture generally comprises the steps of (1) forming a lowest layer of integrated circuitry on a surface of an interposer; (2) forming successive layers of the integrated circuitry on the lowest layer of integrated circuitry; and (3) attaching an electrically conductive functional layer to the interposer. Alternatively, the method of manufacture may comprise the steps of (1) forming the lowest layer of integrated circuitry on the interposer surface; (2) forming successive layers of integrated circuitry on the lowest layer; and (3) forming an electrically conductive structure from a functional layer attached to the interposer.

The method of use generally comprises the steps of (i) causing or inducing a current in the present device sufficient for the device to radiate, reflect or modulate detectable electromagnetic signals; (ii) detecting the detectable electromagnetic radiation; and optionally, (iii) processing information conveyed by the detectable electromagnetic radiation. Optionally, the method of use may further comprise the step of (iv) transporting or transmitting information from the present device (or sensor) back to a reading device.

One potential approach to producing very low-cost RFID tags may use printing techniques in a web- or sheet-fed process. Printing has potential cost advantages, since it can increase materials utilization (e.g., additive or semi-additive processing), combine deposition and patterning steps, and leverage low capital expenditures and operating costs for equipment. Furthermore, high throughput conventional printing processes can be adapted to flexible substrates (e.g., a plastic sheet or a metal foil), improving tag uses in a number of applications. The materials efficiency and additive processing approaches enables a lower cost per unit area of processed interposers (or die, when used), which enables low cost attach processing and/or integration of passive devices with the active circuitry. Also, mask-less processes such as printing enable facile customization of RF devices, for example where each individual RF device is provided with a unique identification code and/or a unique response time delay with respect to a reader inquiry.

Furthermore, if circuitry can be directly printed on the antenna or inductor structure itself, the attach steps and related costs can be eliminated. This approach diverges from the conventional semiconductor wafer cost reduction approach of reducing die cost by decreasing die size (although this approach may become self-limiting for direct-attached Si RFID tags, as the attach costs increase for smaller die). However, a fully-printed, non-area constrained RFID tag may further benefit from development of certain processes, tools, and/or materials that may not be widely or commercially available. The "integrated interposer" approach outlined herein allows for the combination of printing and low cost per unit area display processing (e.g., 0.35 micron Si die processing costs are presently about $25/in$^2$; conventional display polysilicon processing costs are about $0.50-$0.90/in$^2$; and printing-based processing is expected to cost <<$0.50/in$^2$).

By using an interposer-based process, some or all conventional thin film display and photovoltaic materials processing is possible. Photovoltaic materials processing includes well-developed roll-to-roll manufacturing processes for inorganic semiconductors, dielectrics and other films on foils, sheets and/or other flexible substrates. For single films, the cost for such processing can be in the range of about $0.01/in$^2$ or less. Thus, the cost for such processing is not prohibitive for a relatively small interposer (25 mm$^2$ or so), whereas it is expected to be prohibitive if the entire inductor or antennae substrate must be processed (i.e., an area >>100 mm$^2$). The cost savings can be greater than the low resolution interposer attach costs ($0.003), and such processing provides an effective way to make RFID tags with display and photovoltaics type process equipment by itself (or alternatively, in combination with printing steps that may enable a full manufacturing process without waiting for a full tool and materials set to be developed for printed RFID tags). Ultimately, however, such processing includes spool-based and/or roll-to-roll printing processes, which should drive the manufacturing costs even lower due to the lower capital equipment costs, the high throughput (several hundreds of m$^2$/hr), the increased efficiency in materials usage, and/or the decreased number of processing steps.

The present invention advantageously provides a low cost RF and/or RFID tag capable of standard applications and operations using conventional RF, RFID and/or electronic article surveillance (EAS) equipment and systems. By reducing the number of expensive and/or low throughput attachment steps, as well as reducing the cost of fabricating the active electronics, a low cost tag may be produced by directly printing or otherwise forming the circuitry on an interposer that is then relatively cheaply attached at relatively low accuracy to an inductor/carrier. These and other advantages of the present invention will become readily apparent from the detailed description of preferred embodiments below.

DETAILED DESCRIPTION OF THE PREFERRED EMBODIMENTS

Figure 1A:
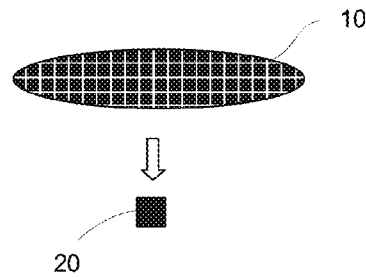
FIGS. 1A-1C show steps in a conventional process for manufacturing RFID tags involving attachment of a conventional semiconductor die on an interposer.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

For the sake of convenience and simplicity, the terms "coupled to," "connected to," and "in communication with" mean direct or indirect coupling, connection or communication unless the context indicates otherwise. These terms are generally used interchangeably herein, but are generally given their art-recognized meanings. Also, for convenience and simplicity, the terms "RF," "RFID," and "identification" may be used interchangeably with respect to intended uses and/or functions of a device and/or tag, and the term "tag" or "device" may be used herein to refer to any RF and/or RFID sensor, tag and/or device. Also, the term "integrated circuitry" refers to a unitary structure comprising a plurality of electrically active devices formed from a plurality of conductor, semiconductor and insulator thin films, but generally does not include discrete, mechanically attached components (such as die, wire bonds and leads, the interposer, or an antenna and/or inductor component), or materials having primarily an adhesive function. In addition, the terms "item," "object" and "article" are used interchangeably, and wherever one such term is used, it also encompasses the other terms. In the present disclosure, a "major surface" of a structure or feature is a surface defined at least in part by the largest axis of the structure or feature (e.g., if the structure is round and has a radius greater than its thickness, the radial surface[s] is/are the major surface of the structure).

The present invention concerns a RF sensor, RF surveillance and/or RF identification device, comprising (a) an interposer, (b) an antenna and/or inductor on the interposer; and (c) integrated circuitry on a surface of the interposer in a location other than the antenna and/or inductor, the integrated circuitry having a lowest layer in physical contact with the surface of the interposer. In various embodiments, the integrated circuitry comprises thin film transistors, diodes, optional capacitors and/or resistors, and metallization interconnecting such circuit elements. In other embodiments, at least one layer of the integrated circuitry comprises a printed or laser patterned layer.

In a further aspect, the present invention concerns a method of manufacturing a sensor, surveillance and/or identification device, generally comprising the steps of (1) forming a lowest layer of integrated circuitry on a surface of an interposer; (2) forming successive layers of the integrated circuitry on the lowest layer of integrated circuitry; and (3) attaching an electrically conductive functional layer to the interposer. Alternatively, the method of manufacture may comprise the steps of (1) forming the lowest layer of integrated circuitry on the interposer surface; (2) forming successive layers of integrated circuitry on the lowest layer; and (3) forming an electrically conductive structure from a functional layer attached to the interposer. In various embodiments, one or more layers of the integrated circuitry are formed by printing or laser patterning the layer of material. In one implementation, forming the lowest layer of integrated circuitry comprises printing or laser patterning the lowest layer.

In an even further aspect, the present invention concerns a method of detecting an item or object, generally comprising the steps of (A) causing or inducing a current in the present surveillance and/or identification device affixed to or associated with the item or object sufficient for the device to radiate, reflect or modulate detectable electromagnetic signals; (B) detecting the detectable electromagnetic radiation; and optionally, (C) processing information conveyed by the detectable electromagnetic radiation. Optionally, the method may further comprise the step of transporting or transmitting information from the present device (or sensor) back to a reading device. The invention, in its various aspects, will be explained in greater detail below with regard to exemplary embodiments.

Exemplary MOS RFID Tags/Devices

One aspect of the invention relates to an RF identification device, comprising (a) an interposer; (b) an antenna and/or inductor on the interposer; and (c) integrated circuitry on the interposer in a location other than the antenna and/or inductor, the integrated circuitry having a lowest layer in physical contact with the surface of the interposer. As a result, the present invention provides a low-cost RFID (or EAS) tag (which may also include sensors, the signal modulation activities of which generally change as a result of certain external changes in the environment [e.g., temperature, conductivity of the structure or surface to which the sensor is attached, etc.], and active RFID devices; e.g., tags with a battery on board) comprising a substrate (e.g., an interposer), an inductor/antenna, and an RF front end (or subset of an RF front end and logic circuit) fully capable of operating in accordance with modern RFID standards.

It has been shown that printed electronics based on inorganic materials (e.g., laser printed nanocrystals) can be formed on certain flexible substrates, such as high temperature polyimides or metal foils, if a suitable thermal isolation/barrier layer is inserted between the substrate (e.g., the metal foil) and subsequent layers that will be laser processed. Thus, the present invention makes advantageous use of such materials as a substrate or interposer in a flexible, (at least partially) printed EAS, RF or RFID tag or device.

The interposer generally has a size that can be cost-effectively processed using conventional thin film processes and/or emerging or state-of-the-art printing processes, to produce low-cost RF circuits. Integrated circuitry can be formed on a flexible interposer substrate such as polyimide, glass/polymer laminate, high temperature polymer, or metal foil, all of which may further include one or more barrier coats. Such interposer substrates are generally substantially less expensive than a conventional Si die of similar size. (However, a conventional RFID interposer typically has a size on the order of 1 cm$^2$ in area, as compared to a conventional Si RFID die, which might be about 0.01 cm$^2$ or less in area.)

It may be advantageous to use as the interposer substrate an anodized Al, Al/Cu, stainless steel or similar metal foil as interconnect, electrodes and dielectric for large storage or IC resonance capacitors, inductors and/or as an electrode for a diode, MOS-device or FET, or as a WORM/OTP, deactivation or other memory storage element. Examples of such substrates can be found in U.S. patent application Ser. Nos. 10/885,283 and 11/104,375, respectively). Substrates (e.g., interposer substrates) formed from a thin metal sheet or foil provide a number of advantages. For example, one of the electrodes of the device (preferably, a gate and/or capacitor plate) can be formed from the metal sheet or foil. A thin metal sheet or foil (which may have a major surface composed primarily of Al or Ta) provides a convenient source for a dielectric film by a relatively simple and straight-forward process technology, such as anodization. Also, metal sheets and/or foils have suitable high-temperature processing properties for subsequent processing steps, unlike many inexpensive organic polymer substrates. As a result, in many embodiments, the antenna and/or inductor will be on a first surface of the interposer, and the integrated circuitry will be on a second surface of the interposer opposite the first surface.

Thus, the invention may relate to an identification device, comprising (a) an interposer, (b) an antenna and/or inductor on a first surface of the interposer; and (c) integrated circuitry on a second surface of the interposer opposite the first surface, the integrated circuitry having a lowest layer in physical (and, in some embodiments, electrical) contact with the second surface of the interposer. In one embodiment, the integrated circuitry comprises at least one printed layer. The printed layer(s) may comprise a semiconductor layer, an interlayer dielectric layer, a metal interconnect layer, and/or a gate metal layer.

In general, the integrated circuitry may comprise a gate metal layer; one or more semiconductor layers (e.g., a transistor channel layer, a source/drain terminal layer, and/or one or more lightly- or heavily-doped diode layers); a gate insulator layer between the gate metal layer and a semiconductor layer; one or more capacitor electrodes (each of which is generally capacitively coupled to another capacitor electrode, which may also be part of the integrated circuitry or which may be integrated with or part of the interposer or antenna/inductor layer); a plurality of metal conductors in electrical communication with the gate metal layer, the source and drain terminals, and/or an uppermost diode layer and/or capacitor electrode; and/or an interlayer dielectric between the metal conductors and the semiconductor layer. The integrated circuitry may further comprise one or more resistors, which may comprise a metal and/or lightly or heavily doped polysilicon. In one embodiment, the integrated circuitry comprises a gate metal layer, a plurality of semiconductor layers (a transistor channel layer in contact with a source/drain terminal layer), a gate insulator layer between the gate metal layer and the transistor channel layer, and a plurality of metal conductors in electrical communication with the gate metal layer and the source and drain terminals. Exemplary layers of integrated circuitry are described in greater detail below, with regard to an exemplary method of making a MOS RFID tag/device.

The interposer may comprise a flexible material that may be adapted to withstand relatively high-temperature processing (e.g., a temperature of 300° C., 350° C., 400° C., 450° C. or more, up to a temperature of 500° C., 600° C., or 1000° C., generally without significant deterioration or decrease in its mechanical and/or electrical properties). For example, the interposer may comprise a thin (50-200 micron) glass sheet or "slip," a glass/polymer laminate, a high temperature polymer (e.g., a polyimide, a polyethersulfone, polyethylene naphthalate [PEN], polyether ether ketone [PEEK], etc.), or a metal foil such as aluminum or stainless steel. Exemplary thicknesses depend on the material used, but in general, range from about 25 μm to about 200 μm (e.g., from about 50 μm to about 100 μm).

The antenna and/or inductor may comprise the antenna, the inductor, or both, and may further comprise a capacitor electrode coupled thereto or integrated therewith (see, e.g., U.S. patent application Ser. Nos. 10/885,283 and 11/104,375, filed on Jul. 6, 2004 and Apr. 11, 2005, respectively). Generally, the antenna and/or inductor comprises a metal. In one embodiment, the metal may be one commercially available as a foil (e.g., aluminum, stainless steel, copper, or an alloy thereof). In such cases (and where antenna and/or inductor components made from the metal foil, on the one hand, and the integrated circuitry on the other hand are on opposite sides of the interposer), the method of making a RFID and/or EAS device (see the following section) may further comprise the step of removing from the metal foil one or more portions of the metal located under (or opposite) electrically active integrated circuitry (e.g., transistors and diodes, but not necessarily capacitors using a portion of the metal foil as an electrode or plate).

In an embodiment comprising both an antenna and an inductor, the inductor may function as a tuning inductor (see, e.g., U.S. patent application Ser. No. 11/104,375). As a result, the metal forming the antenna and inductor may not be continuous (i.e., it may contain an electrical disconnection), and a surveillance and/or identification device in accordance with the invention may comprise a first (e.g., outer) inductor coupled to a first capacitor plate, a second (e.g., inner) inductor coupled to a second capacitor plate, a dielectric film on the first (outer) inductor, the second (inner) inductor, and the first and second capacitor plates, the first dielectric film having openings therein exposing ends of each of the first and second (e.g., outer and inner) inductors. In alternative embodiments, the capacitor plates may be linear or nonlinear, and/or the device may further comprise first and second nonlinear capacitor plates on the dielectric film, respectively coupled to the first and second linear capacitor plates.

The present device may also further comprise a support and/or backing layer (not shown) on a surface of the inductor 110 opposite the dielectric film 20. The support and/or backing layer are conventional, and are well known in the EAS and RFID arts (see, e.g., U.S. Pat. Appl. Publication No. 2002/0163434 and U.S. Pat. Nos. 5,841,350, 5,608,379 and 4,063,229). Generally, such support and/or backing layers provide (1) an adhesive surface for subsequent attachment or placement of the tag/device onto an article to be tracked or monitored, and/or (2) some mechanical support for the tag/device. For example, the present device may be affixed to the back of an identification label or price tag, and an adhesive coated or placed on the surface of the device opposite the identification label or price tag (optionally covered by a conventional release sheet until the label or tag is ready for use), to form a label or tag suitable for use in a conventional RFID system.

Exemplary Method(s) for Making a MOS RFID Tag/Device

In one aspect, the present invention concerns a method for making an identification device, comprising the steps of: (1) forming a lowest layer of integrated circuitry on an interposer; (2) forming successive layers of the integrated circuitry on the lowest layer of integrated circuitry; and (3) attaching an electrically conductive functional layer to the interposer, generally in a location other than the integrated circuitry. Alternatively, the method of manufacture may comprise the steps of (1) forming the lowest layer of integrated circuitry on the interposer surface; (2) forming successive layers of integrated circuitry on the lowest layer; and (3) forming an electrically conductive structure from the interposer (e.g., when the interposer comprises an electrically conductive material, such as a metal foil) or a functional layer attached to the interposer (e.g., when the interposer comprises a laminate of an electrically conductive material and an electrically inactive material, such as a metal foil having an anodized oxide film formed or grown thereon). Thus, the present method provides a cost-effective method for manufacturing RFID devices.

Figure 2A:
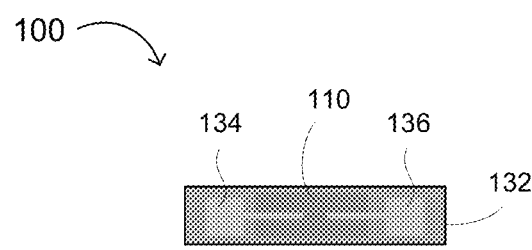
FIGS. 2A-2B show key steps in an exemplary process for manufacturing the present RFID tag/device having an integrated interposer.
Figure 2B:
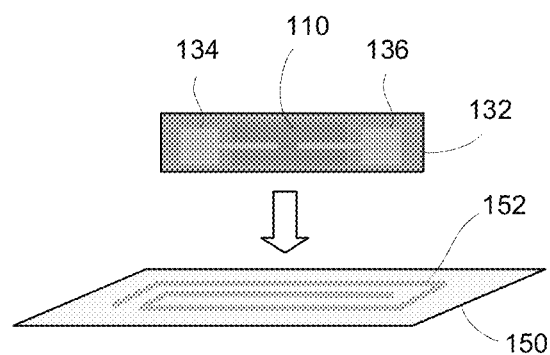

A first exemplary method for manufacturing the present RFID device is described below with reference to FIGS. 2A-2B. FIG. 2A shows tag precursor 100, comprising interposer 132, having thereon pads 134 and 136 and integrated circuitry 110. Generally, integrated circuitry 110 is formed on a first major surface of interposer 132. The integrated circuitry 110 can be realized as a printed inorganic circuit, largely using the techniques described in U.S. patent application Ser. Nos. 10/885,283 and 11/104,375, filed on Jul. 6, 2004 and Apr. 11, 2005, respectively. Such integrated circuitry may include one or more capacitor plates, a dielectric film, a semiconductor component, an interlayer dielectric, a conductor, and/or a passivation layer. Exemplary steps in forming "bottom gate" devices using this approach are described below and are depicted in partial cross-section in FIGS. 3A-3H.

Thereafter, pads 134 and 136 are formed on the same surface of interposer 132 as integrated circuitry 110, similar to the process for forming pads 34 and 36 in FIG. 1A. However, in the exemplary process of FIG. 2A, there are generally holes or vias present in the uppermost dielectric layer of integrated circuitry 110 (sometimes known as the passivation layer) to enable electrical communication with circuit elements therein (generally, upper layer metallization or interconnects; see, e.g., FIGS. 3G-3H and the discussion thereof below). Pads 134 and 136 provide essentially the same function as pads 34 and 36 in FIG. 1A.

Figure 1B:
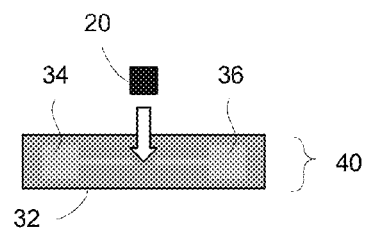
Figure 1C:
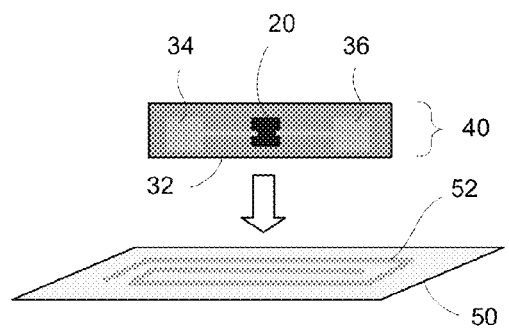

Next, holes or vias may be formed in the major surface of interposer 132 opposite that on which pads 134 and 136 and integrated circuitry 110 have been formed. Generally, and referring now to FIG. 2A, there is one hole or via through interposer 132 exposing a surface of pads 134 and 136 and enabling electrical connection to a terminal of antenna/inductor 152. Generally, each hole/via is in a location and has dimensions enabling facile contact between one terminal of antenna/inductor 152 and the corresponding pad, using a relatively high-throughput, low resolution attachment operation (as compared to a pick-and-place operation or wire bonding process for integration of a die 20 to an inductor substrate 40; see FIG. 1B). Referring back to FIG. 2B, inductor and/or antenna 152 (which may be affixed to or positioned on an applicator sheet 150) is then attached or affixed to interposer 132 such that electrical connections are formed between pads 134 and 136 and terminals of antenna/inductor 152 at locations corresponding to the holes or vias in interposer 132. A short annealing step (which may further comprise applying a small pressure to the opposed major surfaces of integrated interposer 132 and applicator sheet 150) may secure the inductor and/or antenna 152 relatively reliably to the integrated interposer 132.

The process described here can result in a lower overall tag cost by reducing the number of expensive/low throughput attachment steps, as well as reducing the cost of fabricating the active electronics. A low cost tag may be produced by directly printing or otherwise forming the circuitry on an interposer that is then relatively cheaply attached at relatively low accuracy to an inductor/carrier. This may be advantageous where the processing of the circuitry may be performed on a flexible substrate such as polyimide, glass/polymer laminate, high temperature polymer, or metal, all of which may further include one or more barrier coats.

The interposer is generally of a size that enables cost-effective manufacturing using conventional thin film processes, as well as conventional and/or state-of-the-art printing processes, to produce low-cost RF circuits. These processes include sputtering, evaporation, LPCVD, PECVD, bath etching, dry etching, direct laser printing of device elements, ink jet printing of any element or layer, spray coating, blade coating, extrusion coating, photolithography, printed etch mask lithography of any layer (such as laser or inkjet), offset printing, gravure printing, embossing, contact printing, screen printing, combinations thereof, and/or other techniques. Nearly any layer of material in the integrated circuitry of the present invention can be made by essentially any of these techniques. In particular, the present invention enables low-cost manufacturing of RFID and/or EAS tags by low-cost process technologies, such as printing or a combination of printing and conventional display (e.g., flat panel display) processing. In the latter case, use of the interposer as a substrate for manufacturing integrated circuitry enables a decrease in the effective area onto which active materials may be blanket-deposited (e.g., by CVD) and/or processed by equipment/processes conventionally used to make the integrated circuitry. Thus, the present method may further comprise the step of forming one or more second layers of the integrated circuitry by conventional display processing, for example.

As will become apparent from the following description, in the present invention, the antenna and/or inductor can be formed on the same side or on opposite sides of the interposer. Also, equipment that processes continuous roll- or spool web-based substrates can be used to make the present integrated circuitry on the interposer (as well as to attach the antenna/inductor structure, in those embodiments in which the antenna and/or inductor are attached to the interposer after making the integrated circuitry).

Exemplary Method(s) for Making Integrated Circuitry

Generally, integrated circuitry is formed directly on a first major surface of interposer 132. For "top gate" type devices with integrated capacitors and diodes, the integrated circuitry 110 can be realized as a (partially) printed, substantially inorganic circuit, using the techniques described in U.S. patent application Ser. Nos. 11/084,448, 11/203,563, and 11/452,108, filed on Mar. 18, 2005, Aug. 11, 2005, and Jun. 12, 2006, respectively.

Exemplary steps in forming "bottom gate" devices are described below and are depicted in partial cross-section in FIGS. 3A-3H. Many of the techniques described below (although not necessarily used to make bottom gate devices) are also described in U.S. patent application Ser. Nos. 11/084,448, 10/885,283, and 11/104,375, filed on Mar. 18, 2005, Jul. 6, 2004, and Apr. 11, 2005, respectively.

Prepare Interposer Substrate

Figure 3A:
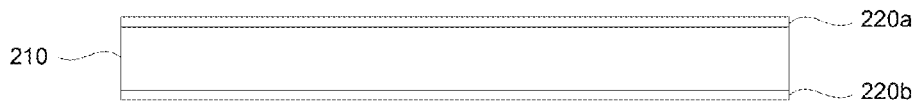
FIGS. 3A-3H show key steps in exemplary processes for making integrated circuitry on an interposer substrate for the present RFID tag/device.

Referring now to FIG. 3A, the interposer substrate 210 may comprise any flexible or inflexible, electrically active or insulative substrate capable of (i) providing physical support for the integrated circuitry formed thereon during formation thereof and for the RF transmitter/receiver components attached thereto during attachment thereof, (ii) having integrated circuitry formed (preferably printed) thereon, and (iii) enabling electrical connections to be formed therethrough (i.e., so that signals can be transmitted between integrated circuitry formed on one major surface of the interposer and the RF receiver/transmitter components attached to the opposite major surface of the interposer). The interposer 210 may thus comprise a metal foil (preferably, with a dielectric film [which may be anodized] thereon), polyimide, thin glass, or inorganic/organic laminate substrate. A metal sheet/foil is advantageously used because it may be (1) electrochemically anodized to reproducibly and/or reliably provide a suitable dielectric film, (2) later formed into the inductor and/or lower capacitor plate, and/or (3) serve as a mechanically and/or physically stable substrate for device processing.

Preferably, the interposer substrate 210 is conventionally cleaned and coated with a barrier material 220 (such as silicon dioxide or aluminum oxide) before further processing. The coating step may comprise oxidation and/or anodization of a surface material of the interposer substrate (e.g., a metal foil), deposition of spin-on or fluid coated barrier films (Honeywell AcuGlass series or others), sputtering, CVD, or spray coating a barrier material onto the interposer substrate, or a combination of any of these processes. As shown in FIG. 3A, the barrier material 220*a-b* coats at least two major surfaces of the interposer 210. Optionally, the surface of at least one barrier material layer (e.g., 220*a*) may be treated (e.g., roughened, activated, etc.) and/or cleaned prior to the next step. To the extent the interposer comprises a metal sheet or foil, the metal foil may be etched and/or cut as described in U.S. patent application Ser. Nos. 10/885,283, 11/104,375 and 11/452,108, filed on Jul. 6, 2004, Apr. 11, 2005, and Jun. 12, 2006, respectively, to isolate the contact pads for the antenna.

For example, a capacitor plate and an inductor comprise an electrically conductive material, which may be a first metal formed from a single sheet or foil of a metal or alloy. However, in alternative embodiments, the metal/alloy for the capacitor plate and/or inductor may be conventionally deposited or printed. The metal may comprise aluminum, titanium, copper, silver, chromium, molybdenum, tungsten, nickel, gold, palladium, platinum, zinc, iron, or a conventional alloy thereof. Other conductive materials may include conductive inorganic compound films such as titanium nitride, tantalum nitride, indium tin oxide, etc., and doped semiconductors such as doped silicon, doped germanium, doped silicon-germanium, doped gallium arsenide, doped (including autodoped) zinc oxide, zinc sulfide, etc.

The dielectric film (e.g., on the substrate) preferably is designed and made such that application of a deactivating radio frequency electromagnetic field induces a voltage differential in the capacitor across the dielectric film that will deactivate the tag/device through breakdown of that film to a shorted state or a changed capacitance such that the tag circuit no longer resonates at the desired frequency. For example, a voltage differential of about 4 to about 50 V, preferably about 5 to less than 30 V, more preferably about 10 to 20 V, or any desired range of endpoints therein can deactivate the tag/device.

In most of the present EAS and/or RFID tags, a conductor generally further comprises a second capacitor plate (i) capacitively coupled (or complementary) to the first capacitor plate. While the conductor and the capacitor plate are preferably formed at the same time from the same material(s), they may be formed separately and/or from different materials. Also, while the conductor may comprise any electrically conductive material, generally the conductor comprises a second metal, which may be selected from the same materials and/or metals described above for the first capacitor plate and/or inductor. In preferred embodiments, the second metal comprises or consists essentially of silver, gold, copper or aluminum (or a conductive alloy thereof).

Gate and Gate Layer Interconnect Formation

Figure 3B:
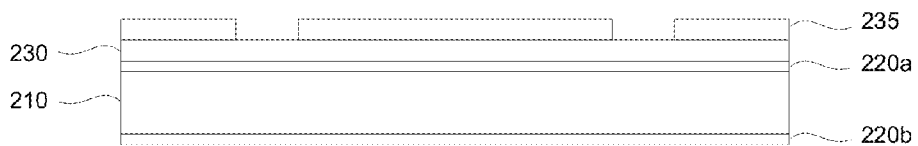

Referring now to FIG. 3B, a gate metal layer 230 may be conventionally sputtered onto barrier material layer 220*a*. The gate metal layer 230 may comprise any metal conventionally used in integrated circuits and/or printed circuitry, such as aluminum, titanium, tantalum, chromium, molybdenum, tungsten, iron, cobalt, rhodium, iridium, nickel, palladium, platinum, copper, silver, gold, zinc, etc., or alloy thereof, such as aluminum-titanium, aluminum-copper, aluminum-silicon, molybdenum-tungsten, titanium-tungsten, etc., or electrically active (e.g., conductive) compound thereof, such as titanium nitride, titanium silicide, tantalum nitride, tantalum silicide, molybdenum nitride, molybdenum silicide, tungsten nitride, tungsten silicide, cobalt silicide, etc. Gate metal layer 230 may have a conventional thickness (e.g., of from 50 nm to 5000 nm, preferably from 80 nm to 3000 nm, more preferably from 100 nm to 2500 nm, or any range of thicknesses therein).

Figure 3C:
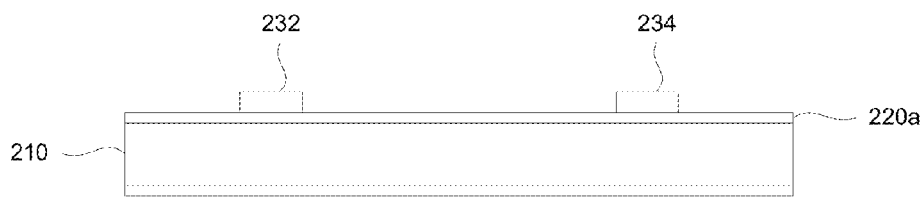

Thereafter a resist may be deposited thereon. The resist may comprise a conventional photoresist or a thermal resist, and may be conventionally deposited or formed on gate metal layer 230 (e.g., spin coating or ink jetting). Conventional photolithography or print/pattern lithography by laser irradiation may be performed (e.g., selectively irradiating portions of the resist, then developing the resist [selectively removing irradiated or non-irradiated portions of the resist, depending on whether the resist is positive or negative] with a conventional developer; see, e.g., U.S. patent application Ser. No. 11/203,563, filed on Aug. 11, 2005) to leave a patterned resist 235 that defines the gates, as shown in FIG. 3B, and gate-level interconnects (not shown, but which may take the form of a conventional "landing pad" located outside the cell or active area of a transistor or other circuit component formed from gate metal layer 230). The exposed gate metal 230 is then etched, and the patterned resist 235 stripped, to form gates (e.g., 232 and 234 as shown in FIG. 3C) and gate-level interconnects. Alternatively, the gate layer 230 may be deposited and patterned by printing (e.g., inkjetting) of a metal precursor ink and subsequent curing, and/or laser patterning of a metal precursor layer (which may include both direct conversion [e.g., laser-induced direct conversion to metal] and indirect conversion [e.g., laser-induced crosslinking of metal-containing species and subsequent annealing to form a conductive metal film]).

Form Gate Dielectric

Figure 3D:
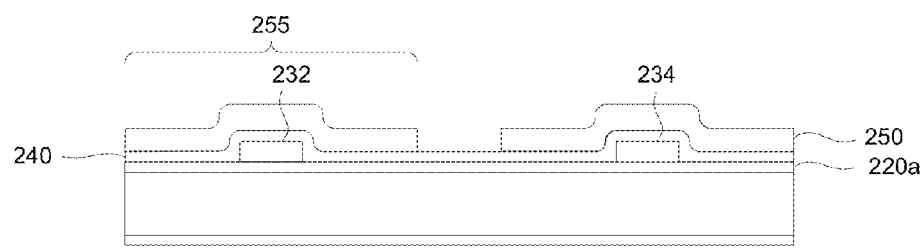

Referring now to FIG. 3D, a gate dielectric layer 240 (comprising, e.g., a nitride and/or oxide of silicon, aluminum, etc.) is formed over the gates and gate-level interconnects 232 and 234 by sputtering, CVD or other blanket deposition process. Gate dielectric layer 240 may have a thickness of from 10 nm to 100 nm, preferably from 10 nm to 50 nm, more preferably from 10 nm to 40 nm, or any range of values therein.

Alternatively, gate dielectric layer 240 may be printed (e.g., by ink jetting or other printing process described in U.S. patent application Ser. Nos. 10/885,283 and/or 11/104,375) over the gates and gate-level interconnects 232 and 234.

Appropriate film properties and/or qualities (e.g., thickness, density, dielectric constant, etc.) may be provided by printing and subsequently processing a plurality of layers. Such subsequent processing may comprise oxidizing a printed dielectric precursor material (such as nanoparticles of silicon and/or aluminum), densifying the dielectric material, doping the dielectric material, etc.

In a further alternative, a gate dielectric layer may be formed from gate-level metal structures 232 and/or 234 by direct, conventional thermal or electrochemical (e.g., anodic) oxidation of gate metal 232 and/or 234. One or more of the gate-level metal structures may be conventionally masked (e.g., with a photo- or laser-patternable resist) if a dielectric film is not desired thereon.

Form Semiconductor Layer(s)

Thereafter, as shown in FIG. 3D, a semiconductor layer 250 (which may comprise intrinsic or lightly doped Si) may be sputtered, coated or otherwise blanket deposited (e.g., by CVD) over the gate dielectric layer 240. Semiconductor layer 250 may have a thickness of from 80 nm to 2000 nm, preferably from 100 nm to 1500 nm, more preferably from 150 nm to 1000 nm, or any range of values therein. Semiconductor layer 250, which may be patterned by conventional photolithography or laser patterning (see, e.g., U.S. patent application Ser. No. 11/203,563, filed on Aug. 11, 2005), may function generally as a transistor channel.

Optionally, a contact layer may be formed on semiconductor (channel) layer 250 by conventional masking and ion implantation, or by sputtering, coating or otherwise blanket depositing (e.g., by CVD) a heavily doped Si (source/drain) contact layer onto semiconductor layer 250. Then, if the source/drain contact layer is blanket deposited, source and drain contact structures 252a and 252b may be formed by conventional planarization (e.g., polishing [chemical-mechanical polishing], or deposition of a thermally planarizable material such as a resist and non-selective etch back), and silicon islands may be formed by conventional photolithography, laser irradiation of thermal resists or printed (e.g., ink jetted) resist lithography patterning, followed by dry or wet etching and resist stripping. Portion(s) 255 of the heavily doped Si layer over the gate may be either not formed (e.g., not printed) or removed (e.g., by photolithography and etching, or by forming layer 252 as an amorphous layer, then not laser irradiating [e.g., crystallizing] that portion and removing the non-irradiated portion by etching it selectively to the crystallized silicon) prior to subsequent processing.

Figure 3E:
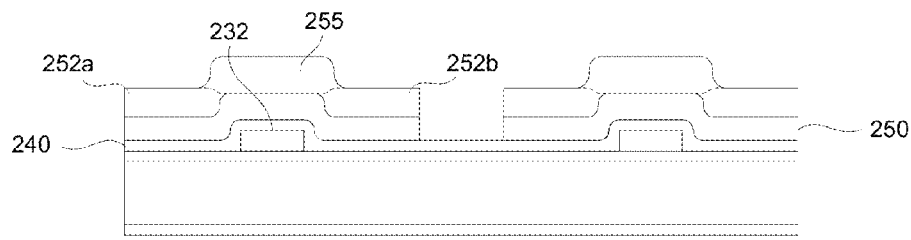

Alternatively, and also as shown in FIG. 3E, semiconductor layer 250 and heavily doped Si contact layer 252a-b may be printed from a semiconductor (e.g., doped or undoped silane) ink in locations corresponding to the silicon islands; see, e.g., U.S. patent application Ser. Nos. 10/789,317, 10/950,373, 10/949,013, 10/956,714, and 11/246,014, filed on Feb. 27, 2004, Sep. 24, 2004, Sep. 24, 2004, Oct. 1, 2004, Oct. 8, 2004, and Oct. 6, 2005, respectively. Generally, semiconductor layer 250 is printed and subsequently processed before heavily doped Si contact layer 252a-b (i.e., without the portion 255 above the gate) is printed thereon. After printing, the ink is dried, cured and/or annealed to change its morphology (e.g., at least partially crystallize the dried ink). Annealing or laser irradiation may also activate some or all of the dopant therein. Printing not only increases throughput by avoiding resist deposition and removal steps, but also enables direct formation of discrete source and drain contact layers 252a and 252b.

Form Interlayer Dielectric and Vias

Figure 3F:
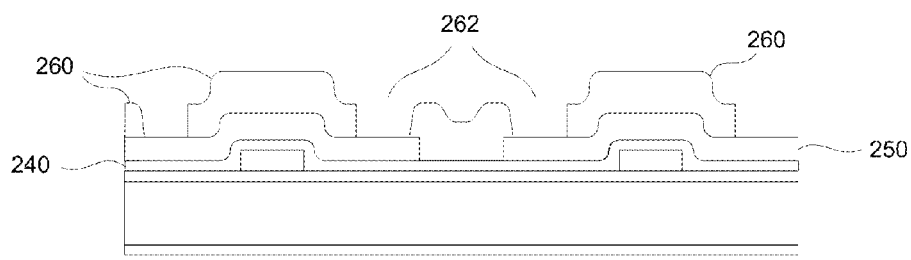

Formation of the interlayer dielectric and vias from the semiconductor and gate layers is largely conventional. For example, as shown in FIG. 3F, a relatively thick dielectric layer 260 may be deposited onto semiconductor layer 250 (and, if present, contact layer 252), then vias 262 may be formed by conventional photolithography, laser irradiation of thermal resists or printed resist lithography patterning, followed by a conventional dielectric etch. Alternatively, a patterned dielectric layer 260 (e.g., with vias 262 formed therein) may be printed onto semiconductor layer 250 (e.g., by ink-jetting, as explained above with regard to the gate dielectric layer 240). Interlayer dielectric 260 may have a thickness, for example, of at least 0.5 µm, and preferably from 1 to 25 µm, 2 to 10 µm, or any range of values therein.

The interlayer dielectric film 260 may comprise any electrically insulative dielectric material, such as oxide and/or nitride ceramics or glasses (e.g., silicon dioxide, silicon nitride, silicon oxynitride, aluminum oxide, tantalum oxide, zirconium oxide, etc.). In some embodiments, interlayer dielectric 260 comprises an oxide and/or nitride of a Group IVA element, which may further contain conventional boron and/or phosphorous oxide modifiers in conventional amounts. Thus, the Group IVA element may comprise or consist essentially of silicon, in which case the interlayer dielectric 40 may comprise or consist essentially of silicon dioxide, silicon nitride, silicon oxynitride, a borosilicate glass, a phosphosilicate glass, or a borophosphosilicate glass (preferably silicon dioxide). The interlayer dielectric may be blanket deposited over the entire device and selected portions thereof removed (e.g., by conventional photolithography and etching), or alternatively, interlayer dielectric may be selectively deposited by, e.g., printing an interlayer dielectric precursor. Alternatively, the interlayer dielectric film may comprise one or more polymers, such as polysiloxanes, parylene, polyethylene, polypropylene, undoped polyimides, polycarbonates, polyamides, polyethers, copolymers thereof, fluorinated derivatives thereof, etc.

Form Source/Drain (S/D) and Interlayer Interconnects

If heavily doped semiconductor layer 252a-b has not been formed (see, e.g., FIG. 3E), S/D layer 270 may be sputtered, coated or otherwise blanket deposited onto interlayer dielectric 260 and into vias 262. Typically, S/D layer 270 comprises a heavily doped semiconductor material, similar to heavily doped semiconductor layer 252a-b. S/D layer 270 may have a thickness, for example, of from 20 nm to 1000 nm, preferably from 40 nm to 500 nm, more preferably from 50 nm to 100 nm, or any range of values therein.

Figure 3G:
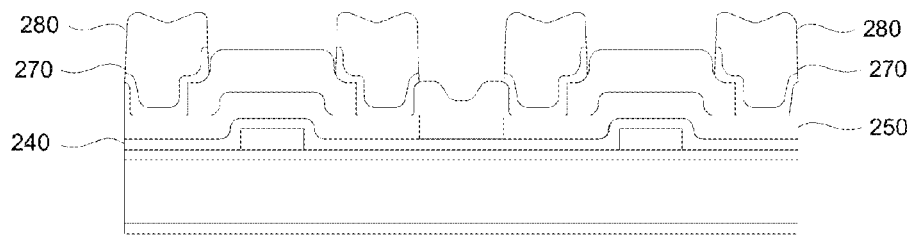

Referring now to FIG. 3G, interconnect metal 280 may be sputtered, coated or otherwise blanket deposited onto S/D layer 270 (including into vias 262). Interconnect metal 280 generally comprises a metal, alloy or electrically active compound, similar to gate metal 230, and may have a thickness, for example, of from 0.5 to 10 µm, preferably from 0.75 to 8 µm, and more preferably from 1 to 5 µm, or any range of values therein. Since interconnect metal 280 may contact a silicon-containing layer, interconnect metal 280 may further comprise a lower silicon barrier layer (e.g., a metal nitride, such as TiN).

Conventional photolithography, laser irradiation of a thermal resist or ink jet resist patterning of the blanket-deposited S/D and interlayer interconnect layers defines the S/D regions and interlayer interconnects, and conventional metal (and semiconductor) etching forms the actual interconnects. Similar connections may be formed to predetermined locations along the gate metal, but preferably in a location other than (e.g., outside of) the silicon islands 255 (see, e.g., FIG. 3E).

Figure 3H:
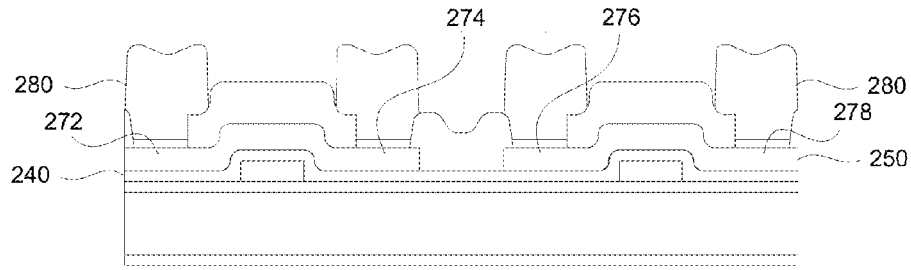

Alternatively, and as shown in FIG. 3H, S/D structures 272-278 may be printed from a semiconductor (e.g., doped or undoped silane) ink in locations corresponding to vias 262

(see, e.g., U.S. patent application Ser. Nos. 10/885,283 and/or 11/104,375). If an undoped ink is used, the process for forming S/D structures 272-278 may further comprise a doping step (e.g., comprising conventional ion implantation or ion shower doping). Thereafter, interconnect metal structures 280 may be formed as described above, with the addition of lower adhesive and/or silicon barrier layers, if desired.

After formation of the integrated circuitry is substantially complete, the present method may further comprise the step of passivating the integrated circuitry and/or the device (e.g., forming a passivation or dielectric layer over the integrated circuitry and, to the extent they may be exposed, portions of the interposer or substrate). The passivation layer generally inhibits or prevents the ingress of water, oxygen, and/or other species that could cause the degradation or failure of the integrated circuitry or device, and may add some mechanical support to the device, particularly during further processing. The passivation layer may be formed by conventionally coating the upper surface of the integrated circuitry and/or device with one or more inorganic barrier layers such as a polysiloxane; a nitride, oxide and/or oxynitride of silicon and/or aluminum; and/or one or more organic barrier layers such as parylene, a fluorinated organic polymer, or other barrier material. Alternatively, the passivation layer may further comprise an underlying dielectric layer, which may comprise a material having lower stress than the overlying passivation layer. For example, the dielectric layer may comprise an oxide, such as $SiO_2$ (e.g., CVD TEOS), USG, FSG, BPSG, etc., and the passivation layer may comprise silicon nitride or a silicon oxynitride. Also, the passivation layer may have a thickness slightly greater than that of the dielectric layer.

At this point in the processing (or at any point where a further material providing some physical or mechanical support to the integrated circuitry or device is added), the mechanical or physical support function of the interposer is no longer necessary. As a result, parts of the interposer supporting the integrated circuitry can be removed entirely (e.g., in the case where the interposer is generally electrically insulating) or in part (e.g., in the case where the interposer is electrically conducting, such as a metal foil, in which case the remaining parts of the interposer may form an antenna, one or more inductors, and/or wire electrically connecting the antenna and/or inductor to a via or contact through the [remaining] interposer to the integrated circuitry or a separate wire thereto). In such a case, the interposer in the final device, tag or sensor may be a dielectric film or other insulator formed on the same surface of the metal foil on which the integrated circuitry is formed.

Hybrid Integrated Circuitry

Alternatively, the tag precursor (e.g., interposer 132 in FIG. 2A having integrated circuitry 110 and pads 132-134 thereon) could take a "hybrid" form. For example, it may be advantageous to combine a printed, inorganic semiconductor- and/or conductor-based RF "front end" in conjunction with a relatively inexpensive, easily fabricated, relatively high functionality organic or conventional Si chip based (digital) logic and/or memory circuit. The term "RF front end" refers to the inductors, capacitors, diodes, and FETs that operate at or near the carrier frequency and/or that modulate that frequency, and is shown by the "IC" area 110 in FIGS. 2A-2B. These elements (and circuit blocks comprising or consisting essentially of such elements) are generally analog in nature (e.g., they function and/or operate in an analog or continuous manner), and may require higher performance devices than the relatively slow, digital logic circuit.

This "hybrid" form may be a particularly advantageous combination in the case of organic circuitry, which may possess certain advantages in terms of cost of materials and/or manufacture. Organic circuitry may be suitable for the controller, logic and/or memory sections of the circuit, which often operate at frequencies significantly lower than the RF frequency (e.g., at 1 MHz or lower). However, organic FET circuitry may not be able to operate effectively at the carrier frequency (e.g., about 13.56 MHz or higher). For example, the design and manufacture of diodes having the desired rectification, leakage and breakdown characteristics based on organic materials have some documented challenges. It may also be difficult to realize effective organic modulation FETs or organic clock-related FETs that operate at the carrier RF frequency. In this case, a hybrid circuit comprising an RF front end as disclosed herein and that is fabricated from high performance printed inorganics, and an organic logic and/or memory circuit which could be fabricated directly on to the RF front end (which would act as the underlying substrate or carrier), may be manufacturable.

As a result, the present invention relates to a method of making an identification device or tag, comprising (1) forming a lowest layer of integrated circuitry on a first surface of an interposer; (2) forming successive layers of the integrated circuitry on the lowest layer of integrated circuitry; and (3) attaching an electrically conductive functional layer to a second surface of the interposer opposite the first surface. The present invention therefore enables a low-cost process for producing an RFID (or EAS) tag comprising a substrate, an RF front end or subset of an RF front end and logic circuit.

An Exemplary Method of Reading the Present RFID Tags

The present invention further relates to method of detecting an item or object in a detection zone comprising the steps of: (a) causing or inducing a current in the present device sufficient for the device to radiate detectable electromagnetic radiation (preferably at a frequency that is an integer multiple or an integer divisor of an applied electromagnetic field), (b) detecting the detectable electromagnetic radiation, and optionally, (c) processing information conveyed by the detectable electromagnetic radiation. Generally, currents and voltages are induced in the present device sufficient for the device to radiate detectable electromagnetic radiation when the device is in a detection zone comprising an oscillating electromagnetic field. This oscillating electromagnetic field is produced or generated by conventional EAS and/or RFID equipment and/or systems. Thus, the present method of use may further comprise the step of (d) transporting or transmitting information from the present device (or sensor) back to a reading device, or (prior to step (a)) attaching or affixing the present device to an object or article (e.g., an identification card, packaging for goods to be shipped, etc.) to be detected, or otherwise including the present device in such an object, article or packaging therefor.

The present tags are designed at least in part to work with electronic identification and/or security systems that sense disturbances in radio frequency (RF) electromagnetic fields. Such electronic systems generally establish an electromagnetic field in a controlled area, defined by portals through which articles must pass in leaving the controlled premises (e.g., a retail store, library, etc.) or a space in which the article must be placed to be read and identified. A tag having a resonant circuit is attached to each such article, and the presence of the tag circuit in the controlled area is sensed by a receiving system that detects the tag and processes information obtained therefrom (e.g., determines unauthorized removal of an article or the identity of goods in a container labeled with the tag). Most of the tags that operate on these principles are single-use or disposable tags, and are therefore designed to be produced at low cost in very large volumes.

Alternatively, the present tag may take the form of a sensor, the RF signal modulation characteristics and/or properties of which may change as the characteristics and/or properties of the object or article to which it is attached change. For example, the present sensor may be attached to a stainless steel (or other metal) object, structure or surface. As the properties of the object, structure or surface change (e.g., the steel oxidizes, a metal having electromagnetic properties becomes magnetized or carries a minimum threshold electrical current, or the object or surface [regardless of its composition] changes temperature by a predetermined difference or a threshold amount), the characteristics and/or properties of the RF signal radiated, reflected or modulated by the present sensor also change in a detectable manner.

The present tags may be used (and, if desired and/or applicable, re-used) in any commercial EAS and/or RFID application and in essentially any frequency range for such applications. For example, the present tags may be used at the frequencies, and in the fields and/or ranges, described in the Table below:

TABLE 1

Exemplary applications.

| Frequencies | Preferred Frequencies | Range/Field of Detection/ Response | Preferred Range/ Field of Detection/ Response | Exemplary Commercial Application(s) |
| --- | --- | --- | --- | --- |
| 100-150 KHz | 125-134 KHz | up to 10 feet | up to 5 feet | animal ID, car anti-theft systems, beer keg tracking |
| 5-15 MHz | 8.2 MHz, 9.5 MHz, 13.56 MHz | up to 10 feet | up to 5 feet | inventory tracking (e.g., libraries, apparel, auto/ motorcycle parts), building security/access |
| 800-1000 MHz | 868-928 MHz | up to 30 feet | up to 18 feet | pallet and shipping container tracking, shipyard container tracking |
| 2.4-2.5 GHz | about 2.45 GHz | up to 30 feet | up to 20 feet | auto toll tags |

The present invention thus also pertains to article surveillance techniques wherein electromagnetic waves are transmitted into an area of the premises being protected at a fundamental frequency (e.g., 13.56 MHz), and the unauthorized presence of articles in the area is sensed by reception and detection of electromagnetic radiation emitted by the present device 100. This emitted electromagnetic radiation may comprise second harmonic or subsequent harmonic frequency waves reradiated from sensor-emitter elements, labels, or films comprising the present device that have been attached to or embedded in the articles, under circumstances in which the labels or films have not been deactivated or otherwise modified for authorized removal from the premises.

Conclusion/Summary

Thus, the present invention provides a MOS identification device having an integrated interposer, and methods for its manufacture and use. The identification device generally comprises (a) an interposer; (b) an antenna and/or inductor on a first surface of the interposer; and (c) integrated circuitry on a second surface of the interposer opposite the first surface, the integrated circuitry having a lowest layer in physical contact with the second surface of the interposer. The method of manufacture generally comprises the steps of (1) forming the lowest layer of integrated circuitry on an interposer surface; (2) forming successive layers of the integrated circuitry on the lowest layer of integrated circuitry; and (3) attaching an electrically conductive functional layer to an opposite surface of the interposer. The method of use generally comprises the steps of (i) causing or inducing a current in the present device sufficient for the device to radiate detectable electromagnetic radiation; (ii) detecting the detectable electromagnetic radiation; and optionally, (iii) processing information conveyed by the detectable electromagnetic radiation and/or (iv) transporting or transmitting information from the present device (or sensor) back to a reading device. The present invention advantageously provides a low cost RF and/or RFID tag capable of standard applications and operations using conventional RF, RFID and/or EAS equipment and systems. By reducing the number of expensive and/or low throughput attachment steps, as well as reducing the cost of fabricating the active electronics, a low cost tag may be produced by directly printing or otherwise forming the circuitry on an interposer that is then relatively cheaply attached at relatively low accuracy to an inductor/carrier.

Novel elements of the invention may include (i) direct integration of circuit manufacturing/processing steps onto an interposer substrate and/or (ii) printing directly onto an interposer carrier, which is then inexpensively attached to an inductor formed on or from a low cost substrate material such as metal foil. In one embodiment, the inductor has a larger area (and thus may have two greater dimensions) than the interposer. Such direct manufacturing/processing steps are compatible with web, continuous, roll-to-roll and/or sheet processing and with conventional flexible, thin RF labels, and should provide an increased throughput in the tag manufacturing process. Fabrication of circuit elements directly on an interposer enables low cost manufacturing, as the resolution of the pick and place process for assembling the interposer and inductor/antenna is low. The inventive approach enables the efficient/low cost use of device substrate materials which are thermally and chemically compatible with RFID and/or EAS tag manufacturing and/or that provide appropriate barrier properties, but which otherwise might be too expensive if used for the interposer substrate of an entire tag.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A surveillance and/or identification device or tag, comprising:
   a) an antenna and/or inductor;
   b) a planar interposer;
   c) a first capacitor plate on or from said planar interposer, electrically coupled or connected to said antenna or inductor at a first location;
   d) an inorganic dielectric layer on said first capacitor plate, the inorganic dielectric layer having a predetermined breakdown voltage; and
   e) a second capacitor plate on said inorganic dielectric layer, electrically coupled or connected to said antenna or inductor at a second location,
   wherein the antenna and/or inductor and the first and second capacitor plates form a resonant circuit that, when the device or tag is in a detection zone comprising an oscillating electromagnetic field, generates, radiates, reflects, or modulates a detectable electromagnetic signal, or causes a disturbance in the oscillating electromagnetic field, and
   the device or tag is deactivated when a deactivating electromagnetic field induces a voltage differential across the inorganic dielectric layer greater than the breakdown voltage.

2. The device of claim 1, wherein said first capacitor plate is on said planar interposer, and said planar interposer comprises a polyimide, a glass/polymer laminate, or a high temperature polymer.

3. The device of claim 1, wherein said planar interposer comprises a metal sheet or foil.

4. The device of claim 1, wherein said first capacitor plate comprises an electrically conductive material.

5. The device of claim 4, wherein said conductive material comprises aluminum, titanium, copper, silver, chromium, molybdenum, tungsten, nickel, gold, palladium, platinum, zinc, iron, or an alloy thereof.

6. The device of claim 4, wherein said conductive material comprises a conductive inorganic compound film.

7. The device of claim 1, wherein said inorganic dielectric layer comprises silicon dioxide, silicon nitride, silicon oxynitride, aluminum oxide, tantalum oxide, zirconium oxide, a polysiloxane, or a fluorinated derivative thereof.

8. The device of claim 7, wherein said inorganic dielectric layer comprises an oxide and/or nitride of a Group IVA element.

9. The device of claim 8, wherein said inorganic dielectric layer consists essentially of silicon dioxide.

10. The device of claim 1, wherein said second capacitor plate is capacitively coupled to said first capacitor plate.

11. A method of reading a surveillance and/or an identification device, comprising:
    a) causing or inducing a current in the device of claim 1 sufficient for the device to radiate, reflect or modulate the detectable electromagnetic signal or cause the disturbance in the oscillating electromagnetic field, and the device or tag is deactivated when the deactivating electromagnetic field induces the voltage differential across the inorganic dielectric layer greater than the breakdown voltage; and
    b) detecting said detectable electromagnetic signal or said disturbance in the oscillating electromagnetic field.

12. The device of claim 1, wherein said predetermined breakdown voltage is from about 10 to 20 V.

13. A method of making a surveillance and/or identification device or tag, comprising:
    a) forming an antenna and/or inductor;
    b) forming a first capacitor plate on or from a planar interposer;
    c) forming an inorganic dielectric layer on said first capacitor plate, the inorganic dielectric layer having a predetermined breakdown voltage;
    d) forming a second capacitor plate on said inorganic dielectric layer; and
    e) attaching said antenna and/or inductor to said first capacitor plate at a first location and to said second capacitor plate at a second location,
    such that when the device or tag is in a detection zone comprising an oscillating electromagnetic field, a current or voltage is induced in the device or tag sufficient for the device or tag to generate, radiate, reflect, or modulate a detectable electromagnetic signal, or cause a disturbance in the oscillating electromagnetic field, and
    when a deactivating electromagnetic field induces a voltage differential across the inorganic dielectric layer greater than the breakdown voltage, the device or tag is deactivated.

14. The method of claim 13, wherein said first capacitor plate is formed on said planar interposer, and said planar interposer comprises a polyimide, a glass/polymer laminate, or a high temperature polymer.

15. The method of claim 13, wherein said planar interposer comprises a metal sheet or foil.

16. The method of claim 13, wherein forming said antenna and/or inductor comprises etching a metal foil.

17. The method of claim 13, further comprising forming an interconnect between said antenna and/or inductor and said second capacitor plate.

18. The method of claim 13, wherein forming said inorganic dielectric layer comprises blanket depositing a dielectric precursor on said first capacitor plate.

19. The method of claim 13, wherein forming said inorganic dielectric layer comprises printing a dielectric precursor on said first capacitor plate.

20. The method of claim 13, wherein said inorganic dielectric layer comprises silicon dioxide, silicon nitride, silicon oxynitride, aluminum oxide, tantalum oxide, zirconium oxide, a polysiloxane, or a fluorinated derivative thereof.

21. The method of claim 20, wherein said inorganic dielectric layer comprises an oxide and/or nitride of a Group IVA element.

22. The method of claim 21, wherein said inorganic dielectric layer consists essentially of silicon dioxide.

23. The method of claim 13, wherein forming said second capacitor plate comprises printing a precursor of said second capacitor plate on said inorganic dielectric layer.

24. The method of claim 13, wherein forming said second capacitor plate comprises depositing a precursor of said second capacitor plate on said inorganic dielectric layer.

25. The method of claim 13, wherein said predetermined breakdown voltage is from about 10 to 20 V.

* * * * *